(12) United States Patent
Li et al.

(10) Patent No.: US 12,462,538 B2
(45) Date of Patent: Nov. 4, 2025

(54) SOURCE-FREE CROSS DOMAIN DETECTION METHOD WITH STRONG DATA AUGMENTATION AND SELF-TRAINED MEAN TEACHER MODELING

(71) Applicant: NEC Laboratories America, Inc., Princeton, NJ (US)

(72) Inventors: Kai Li, Princeton, NJ (US); Renqiang Min, Princeton, NJ (US); Hans Peter Graf, South Amboy, NJ (US)

(73) Assignee: NEC Corporation, Tokyo (JP)

( * ) Notice: Subject to any disclaimer, the term of this patent is extended or adjusted under 35 U.S.C. 154(b) by 496 days.

(21) Appl. No.: 17/966,017

(22) Filed: Oct. 14, 2022

(65) Prior Publication Data

US 2023/0154167 A1    May 18, 2023

Related U.S. Application Data

(60) Provisional application No. 63/279,307, filed on Nov. 15, 2021.

(51) Int. Cl.
G06V 10/774    (2022.01)
G06V 10/25     (2022.01)
G06V 10/764    (2022.01)

(52) U.S. Cl.
CPC .......... *G06V 10/7747* (2022.01); *G06V 10/25* (2022.01); *G06V 10/765* (2022.01); *G06V 2201/07* (2022.01)

(58) Field of Classification Search
CPC .. G06V 10/7747; G06V 10/25; G06V 10/765; G06V 2201/07

(Continued)

(56) References Cited

U.S. PATENT DOCUMENTS

2023/0281980 A1*  9/2023  Wasnik ................ G06V 10/764
                                                        382/155
2024/0233348 A1*  7/2024  Lv ......................... G06V 10/82

OTHER PUBLICATIONS

Chen, Y., Li, W., Sakaridis, C., Dai, D., & Van Gool, L. (2018, Jun. 18). Domain adaptive faster r-cnn for object detection in the wild. In Proceedings of the IEEE conference on computer vision and pattern recognition (pp. 3339-3348).

(Continued)

*Primary Examiner* — Michael R Neff
(74) *Attorney, Agent, or Firm* — Joseph Kolodka; Vincent Duffy

(57) ABSTRACT

A method for implementing source-free domain adaptive detection is presented. The method includes, in a pretraining phase, applying strong data augmentation to labeled source images to produce perturbed labeled source images and training an object detection model by using the perturbed labeled source images to generate a source-only model. The method further includes, in an adaptation phase, training a self-trained mean teacher model by generating a weakly augmented image and multiple strongly augmented images from unlabeled target images, generating a plurality of region proposals from the weakly augmented image, selecting a region proposal from the plurality of region proposals as a pseudo ground truth, detecting, by the self-trained mean teacher model, object boxes and selecting pseudo ground truth boxes by employing a confidence constraint and a consistency constraint, and training a student model by using one of the multiple strongly augmented images jointly with an object detection loss.

20 Claims, 5 Drawing Sheets

(58) Field of Classification Search
USPC .......................................................... 382/159
See application file for complete search history.

(56) References Cited

OTHER PUBLICATIONS

Saito, K., Ushiku, Y., Harada, T., & Saenko, K. (2019, Jun. 15). Strong-weak distribution alignment for adaptive object detection. In Proceedings of the IEEE/CVF Conference on Computer Vision and Pattern Recognition (pp. 6956-6965).

Liang, J., Hu, D., & Feng, J. (Nov. 21, 2020). Do we really need to access the source data? source hypothesis transfer for unsupervised domain adaptation. In International Conference on Machine Learning (pp. 6028-6039). PMLR.

Li, X., Chen, W., Xie, D., Yang, S., Yuan, P., Pu, S., & Zhuang, Y. (May 18, 2021). A free lunch for unsupervised domain adaptive object detection without source data. In Proceedings of the AAAI Conference on Artificial Intelligence (vol. 35, No. 10, pp. 8474-8481).

Liu, Y. C., Ma, C. Y., He, Z., Kuo, C. W., Chen, K., Zhang, P., . . . & Vajda, P. (Feb. 18, 2021). Unbiased teacher for semi-supervised object detection. arXiv preprint arXiv:2102.09480.

\* cited by examiner

SOURCE-FREE CROSS DOMAIN DETECTION METHOD WITH STRONG DATA AUGMENTATION AND SELF-TRAINED MEAN TEACHER MODELING

RELATED APPLICATION INFORMATION

This application claims priority to Provisional Application No. 63/279,307 filed on Nov. 15, 2021, the contents of which are incorporated herein by reference in their entirety.

BACKGROUND

Technical Field

The present invention relates to domain adaptive detection and, more particularly, to source-free domain adaptive detection with strong augmentation and self-trained mean teacher.

Description of the Related Art

Domain adaptive detection aims to learn a detector of good performance in a target domain using unlabeled data, with the help of labeled data from a source domain. Conventional Unsupervised Domain Adaptive Detection (UDAD) approaches address this problem by taking data from both domains as input and aligning the data distributions. Despite the impressive performance, the assumption of these approaches on the accessibility of labeled source data for adaptation prevents them from being deployed in real-world applications in which the labeled source data are protected and not sharable. This motivates investigations on Source-Free Domain Adaptive Detection (SFDAD) in which the labeled source data are only used to learn a pretrained detector, and adaptation is achieved solely with unlabeled target data based on the pretrained detector.

SUMMARY

A method for implementing source-free domain adaptive detection is presented. The method includes, in a pretraining phase, applying strong data augmentation to labeled source images to produce perturbed labeled source images and training an object detection model by using the perturbed labeled source images to generate a source-only model. The method further includes, in an adaptation phase, training a self-trained mean teacher model by generating a weakly augmented image and multiple strongly augmented images from unlabeled target images, generating a plurality of region proposals from the weakly augmented image, selecting a region proposal from the plurality of region proposals as a pseudo ground truth, detecting, by the self-trained mean teacher model, object boxes and selecting pseudo ground truth boxes by employing a confidence constraint and a consistency constraint, and training a student model by using one of the multiple strongly augmented images jointly with an object detection loss.

A non-transitory computer-readable storage medium comprising a computer-readable program for implementing source-free domain adaptive detection is presented. The computer-readable program when executed on a computer causes the computer to perform the steps of, in a pretraining phase, applying strong data augmentation to labeled source images to produce perturbed labeled source images and training an object detection model by using the perturbed labeled source images to generate a source-only model. The computer-readable program when executed on a computer causes the computer to perform the further steps of, in an adaptation phase, training a self-trained mean teacher model by generating a weakly augmented image and multiple strongly augmented images from unlabeled target images, generating a plurality of region proposals from the weakly augmented image, selecting a region proposal from the plurality of region proposals as a pseudo ground truth, detecting, by the self-trained mean teacher model, object boxes and selecting pseudo ground truth boxes by employing a confidence constraint and a consistency constraint, and training a student model by using one of the multiple strongly augmented images jointly with an object detection loss.

A system for implementing source-free domain adaptive detection is presented. The system includes a memory and one or more processors in communication with the memory configured to, in a pretraining phase, apply strong data augmentation to labeled source images to produce perturbed labeled source images and train an object detection model by using the perturbed labeled source images to generate a source-only model. The system further is configured to, in an adaptation phase, train a self-trained mean teacher model by generating a weakly augmented image and multiple strongly augmented images from unlabeled target images, generating a plurality of region proposals from the weakly augmented image, selecting a region proposal from the plurality of region proposals as a pseudo ground truth, detecting, by the self-trained mean teacher model, object boxes and selecting pseudo ground truth boxes by employing a confidence constraint and a consistency constraint, and training a student model by using one of the multiple strongly augmented images jointly with an object detection loss.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
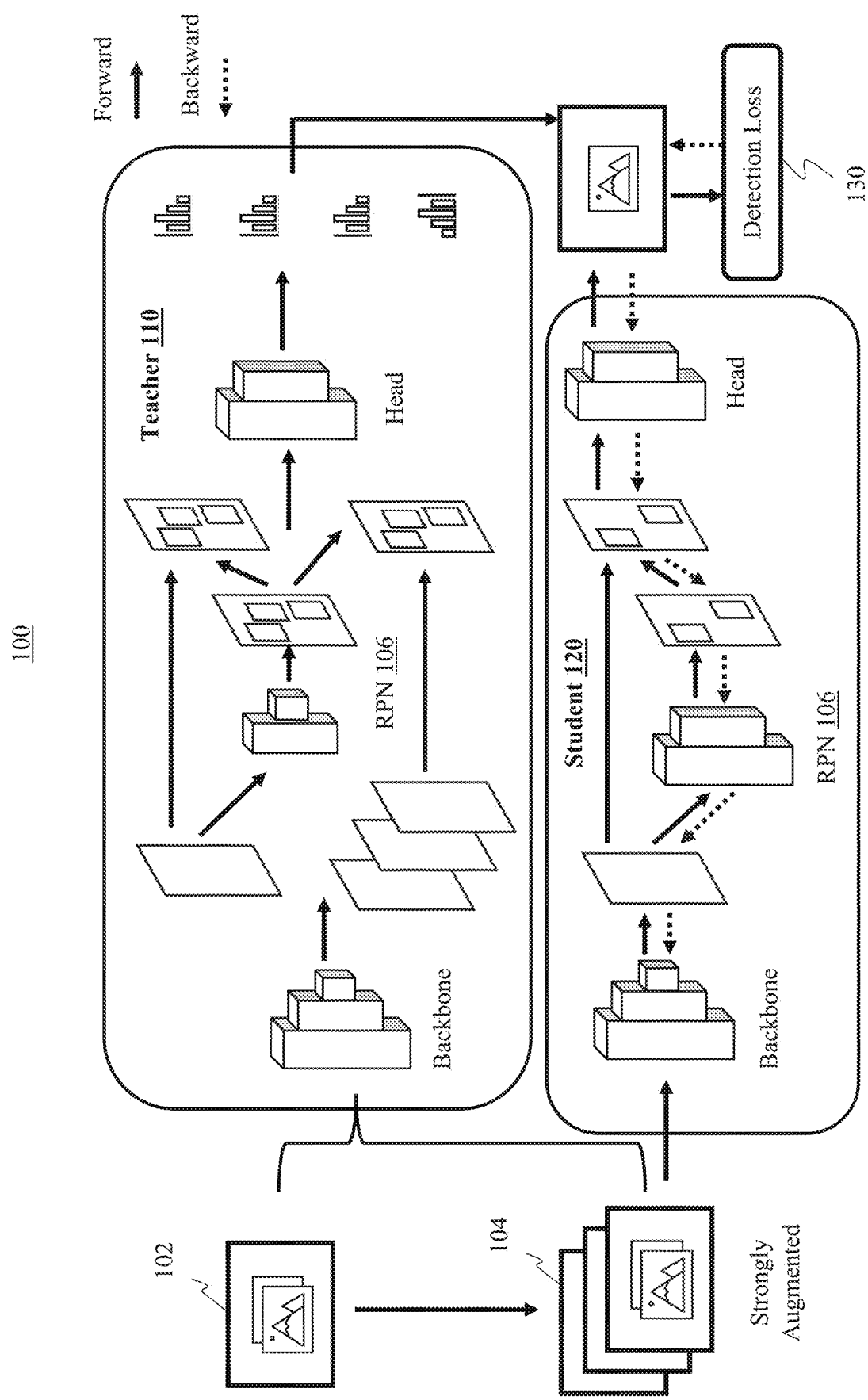
FIG. 1 is a block/flow diagram of an exemplary self-trained mean teacher model framework (or Strong data Augmentation and a Self-Trained Mean Teacher model (SA-STMT)), in accordance with embodiments of the present invention.

Object detection has tremendously advanced in the past few years thanks to deep learning and rich annotated data.

However, it is acknowledged that a well-trained object detector would suffer performance degradation when it is tested on out-of-distribution data. It is not feasible to solve this problem by annotating data from every new distribution and finetuning the detector, as it could be costly and tedious to get the annotations.

Domain adaptive detection aims to address this problem by learning a detector using labeled data from one domain (source domain) and unlabeled data from another domain (target domain). Conventional Unsupervised Domain Adaptive Detection (UDAD) methods achieve this by taking data from both domains as input and explicitly aligning the data distributions, by adversarial learning, pseudo labeling or style transfer.

Despite the impressive performance, these UDAD methods assume the accessibility of labeled source data when learning the adaptive model, which however cannot always be guaranteed. Some real-world applications involve privacy sensitive data (e.g., medical data) such that the data and the annotations are not allowed to be distributed. Some applications involve small devices that have limited memory space and are unable to store the labeled source data. There are also cases where the labeled source data are not available simply because the owners refuse to share them due to commercial reasons.

Source-Free Domain Adaptive Detection (SFDAD) addresses this limitation by decomposing the adaptation process into two separated phases, that is, a pretraining phase and an adaptation phase. In the pretraining phase, a detector is trained using labeled source data. In practice, this phase can be fulfilled in a centralized way to protect labeled data from being distributed. In the adaptation phase, the learned detector is adapted to the target domain using unlabeled data. It is difficult to align data distributions in the absence of data from one domain.

Hence, SFDAD is a more challenging problem than UDAD. A pioneering work for this problem develops a framework in which the pretrained model is used to produce pseudo labels for the unlabeled target images, and then the pseudo labels are used to update the pretrained model. An entropy-based metric is advanced to search an appropriate confidence threshold for pseudo labeling and an image A mosaic-based technique is proposed to simulate false negatives to further reduce noises among the pseudo labels. However, the problem of this method is that the model will still be impacted by any noise in the pseudo labels.

The exemplary embodiments of the present invention introduce a new SFDAD method, SA-STMT, based on Strong data Augmentation and a Self-Trained Mean Teacher model. SA-STMT includes novel techniques in both phases. In the pretraining phase, SA-STMT employs a strong data augmentation technique that produces highly perturbed labeled source images to train the detector. Surprisingly, this simple technique, without accessing the target data during training, significantly improves the cross-domain detection performance and outperforms many existing domain adaptive detectors that use various sophisticated techniques to align the domains using images from both domains.

In the adaptation phase, SA-STMT includes a novel self-trained mean teacher model in which the teacher model produces pseudo labels to train a student model. For each unlabeled target image, multiple strongly augmented views are generated. The teacher model detects object boxes from the image and selects pseudo ground truth boxes by a confidence constraint and a consistency constraint. The confidence constraint requires the highest classification score of a detected object to be above a given threshold, and the consistency constraint requires the detected object in a scene to be classified as the same class when mapped to all the strongly augmented views. With the pseudo ground truth objects, the student model is trained by a detection loss and a consistency regularizer that enforce the consistency of the responses of the student and the teacher to the pseudo ground truth objects.

The contributions are summarized as follows. The exemplary embodiments propose a self-trained mean-teacher model for SFDAD, in which the teacher produces pseudo labels with confidence and consistency constraints, and the student is trained with the pseudo labels based on strongly augmented images. The exemplary embodiments further propose to employ a strong data augmentation technique to train the source-only model, which significantly improves cross-domain detection performance without accessing target data. The exemplary embodiments also propose a source-free solution to the domain adaptive detection problem that reaches comparable or even better performance than existing UDAD approaches that require access to labeled source images for adaptation.

The exemplary methods differ from the existing ones in that the exemplary methods assume that data from the two domains are not simultaneously available, which essentially disables most of the existing techniques. In this more restricted setting, a strong data augmentation-based technique is introduced to enhance the source only model and a self-trained mean teacher model is introduced to achieve adaptation using only unlabeled target images.

Source-Free Domain Adaptive Detection (SFDAD) trains a detection model $\theta$ on a labeled dataset $\mathcal{S} = \{X_S, y_S\}$ from a source domain, and adapts $\theta$ to any given target domain with unlabeled samples $\mathcal{T} = \{X_t\}$. Unlike the conventional unsupervised domain adaptive detection, the labeled source dataset $\mathcal{S}$ is unavailable once the detection model $\theta$ has been learned. This is a challenging problem because the absence of the source data disables most existing distribution alignment techniques, like adversarial alignment. This problem is addressed by proposing a simple yet highly effective data augmentation technique when learning $\theta$ with $\mathcal{S}$, and proposing a self-trained mean teacher model to adapt $\theta$ to the target domain using $\mathcal{T}$.

The goal of this pretraining phase is to learn a detection model $\theta$ with labeled source data $\mathcal{S} = \{X_S, y_S\}$. Without any prior knowledge about the target domain, it is difficult to ensure the generalization performance of $\theta$. A simple yet highly effective strong data augmentation-based technique is employed to enhance the generalizability of $\theta$ on arbitrary unseen target domains.

Strong data augmentation that produces highly perturbed images has proved as an effective technique to enhance model generalizability for supervised learning and semi-supervised learning. Strong data augmentation is employed with respect to the exemplary embodiments to enhance generalizability of the source-only detector.

For each $(s, y_s) \in \mathcal{S}$, RandAugment is applied, which randomly selects a combination of image transformations out of a pool that includes color inversion, translation, contrast adjustment, etc. After that, CutOut is applied, which sets a random square patch of pixels to gray. For ease of implementation, the image transformations that lead to geometric change, e.g., rotation, shearing etc., are skipped. Thus, after augmentation, the label $y_s$ remains unchanged. Thus:

$$s' = \Phi(s) \qquad (1)$$

where Φ represents the strong data augmentation. It is noted that Φ is a stochastic function and that different random combinations of the image transformations can result in very different outputs, which significantly enriches data variance.

With $(s, y_s)$, the exemplary embodiments train the detection model θ and optimize the following object detection loss:

$$L_{det}(X, Y) = \frac{1}{|X_s|} \sum_{(s,y_s) \sim \{X_s, Y_s\}} \left( L_{reg}^{rpn}(s', y_s) + L_{cls}^{rpn}(s', y_s) + L_{reg}^{roi}(s', y_s) + L_{cls}^{roi}(s', y_s) \right), \quad (2)$$

which includes the classification loss and the bounding box regression loss in both the region proposal stage and the box classification and regression stage.

Simply applying this strong augmentation technique when training θ can significantly improve its cross-domain detection performance. The reason is that the strong augmentation includes a wide range of image transformations, and their random combinations can model a wide range of factors that cause domain shifts. Training the detector to be resistant to these factors thus enhances cross-domain detection performance.

With the learned detection model θ, it is adapted to the target domain with only unlabeled samples $\mathcal{T} = \{X_t\}$. The exemplary embodiments propose a self-trained mean teacher model to achieve this.

Given $t \in \mathcal{T}$, strong augmentation is applied 1 multiple times, producing $\{t_m'\}_{m=1}^{M}$ where $t_m' = \Phi(t)$.

The exemplary embodiments use the same strong augmentation Φ as the one used in the pretraining phase. Strong augmentation Φ is a stochastic function. So, all strongly augmented images are different. Strong augmentation Φ generates pseudo labels by the teacher detector $θ_t$ with the confidence and consistency constraints and uses the pseudo labels to train the student detector $θ_s$. The teacher detector $θ_t$ and the student detector $θ_s$ have an identical architecture as the source only detector θ and are initialized with its weights. However, the two detectors are updated differently, that is, $θ_s$ is updated with a gradient back-propagation, while $θ_t$ is updated as the exponential moving average of $θ_s$.

Let $\mathcal{R} = \{r_k\}_{k=1}^{K}$ be the bounding boxes extracted from t by the teacher model $θ_t$ after applying NMS. And let $\mathcal{P} = \{p_k\}_{k=1}^{K}$ and $\mathcal{Z} = \{z_k\}_{k=1}^{K}$ be the corresponding classification probability scores and box regression offsets, respectively. Let $g = [g_1, \ldots, g_k, \ldots, g_K] \subseteq \{0, 1\}^K$ be a binary vector representing the selected boxes as pseudo labels, where $g_k = 1$ means $r_k$ is selected, and $g_k = 0$ otherwise. g is calculated as follows:

$$g_k = \underbrace{\mathbb{1}[\max(p_k) > \sigma]}_{\text{Confidence constraint}} \cdot \underbrace{\prod_{m=1}^{M} \mathbb{1}[c(p_k, p'_{k,m})]}_{\text{Consistency constraint}} \quad (3)$$

where $$c(p_k, p'_{k,m}) = \begin{cases} 1, & \text{if } \arg\max(p_k) = \arg\max(p'_{k,m}) \\ 0, & \text{otherwise} \end{cases} \quad (4)$$

$p_{k,m}'$ is the classification probability of the box corresponding to the box $r_k$ in the strongly augmented image $t_m'$. In other words, bounding box $r_k$ is mapped from image t to the m-th strongly augmented view $t_m'$ and the corresponding classification score $p_{k,m}'$ is obtained by the detection model $θ_t$. So, $p_k$ and $p_k$ represent the classification scores of the same region of interest in the context of different views of the same image. The arg max returns the index of the highest value of a probability score vector, and the index represents the class assignment. max returns the highest value in a vector.

The confidence constraint in Eq. (3) requires that an object box $r_k$ is confidently predicted by the teacher model such that the highest classification score is higher than a given threshold σ. The consistency constraint in Eq. (3) requires that $r_k$ is classified consistently (assigned with the same class label) across all the views. This is a reasonable constraint as a reliable object box should be robustly recognized under various image perturbations.

Having obtained g, the exemplary methods can get a set of purified boxes $\mathcal{R}' = \{r_n\}_{n=1}^{N} \subseteq \mathcal{R}$, which are used as pseudo ground truth labels to train the student model.

With the pseudo ground truth labels $\mathcal{R}' = \{r_n\}_{n=1}^{N}$, the exemplary methods can train the student model with the object detection loss. However, to further mitigate the possible harmful impact of incorrect pseudo labels in $\mathcal{R}'$, a distillation-style consistency regularizer is proposed to jointly train the student model as:

$$L_{stu} = L_{det}(t_m', \mathcal{R}') + \frac{1}{N}\sum_{n=1}^{N} D_{kl}(\hat{p}_{n,m} \mid \tilde{p}_{n,m}) + \frac{1}{N}\sum_{n=1}^{N} \|\hat{z}_{n,m} - \tilde{z}_{n,m}\|_2 \quad (5)$$

where $L_{det}(t_m', \mathcal{R}')$ is the object detection loss for a randomly selected strongly augmented image $t_m'$ with $\mathcal{R}'$ as the ground truth labels. $D_{kl}(\hat{p}_{n,m} \| \tilde{p}_{n,m})$ is the KL divergence of $\hat{p}_{n,m}$ and $\tilde{p}_{n,m}$ which are the classification probabilities produced by the student 120 and the teacher 110, respectively, for the box $r_n$ in $t_m'$. $\|\hat{z}_{n,m} - \tilde{z}_{n,m}\|_2$ measures the difference of the regression offsets of the same box by the teacher 110 and the student 120, respectively.

The two terms of the consistency regularizer seek to distill knowledge from the teacher 110 to the student 120 by enforcing the consistency of their responses to the same object boxes in the same image. The two terms have different effects from the object detection loss $L_{det}(t_m', \mathcal{R}')$ which is calculated with region proposals extracted by the student 120 from $t_m'$ and with R' as the ground truth. The two terms instead are calculated by the outputs of the student 120 and teacher 110. While the supervision signals provided by $\mathcal{R}'$ could be noisy, the signals encoded in $\tilde{p}_{n,m}$ and $\tilde{z}_{n,m}$ are noise-free (without applying thresholding). Therefore, adding the two terms can dilute a possible harmful impact of noisy pseudo labels.

The teacher detector $θ_t$ is updated as the Exponential Moving Average (EMA) of the student detector $θ_s$, $$θ_t = αθ_t + (1-α)θ_s \quad (6)$$

where α is a coefficient near 1.0, e.g., 0.96.

Updating the teacher 110 as the EMA of the student 120, on one hand, injects new knowledge specific to the target domain to the teacher 110, which in return helps generate better pseudo labels from unlabeled target images. On the other hand, negative influence brought by incorrect pseudo labels has less impact on the teacher 110 because it is updated with a small fraction of the student's weights. Moreover, the teacher 110 can be viewed as an ensemble of student models learned in different time steps, and ensemble models are known to have better generalization.

Algorithm 1 reproduced below outlines the main steps of the proposed SA-STMT framework. After training, the teacher detector is applied on the test data.

---
Algorithm 1 Proposed SA-STMT method
---

Input: Labeled source data $\mathcal{S} = \{\mathcal{X}_s, \mathcal{Y}_s\}$ and unlabeled target data $\mathcal{T} = \{\mathcal{X}_t\}$.
Output: Teacher model $\theta_t$ and student model $\theta_s$.
1:     Train the source-only detector $\theta$ on $\mathcal{S}$ by Eq. (2).
2:     Initialize student detector $\theta_s = \theta$ and teacher detector $\theta_t = \theta$.
3:     while not done do
4:         while not done do
5:             Randomly sample $t \sim \mathcal{T}$.
6:             Apply strong augmentation $\Phi$ multiple times and get $\{t'_m\}_{m=1}^M$, where $t'_m = \Phi(t)$.
7:             Produce bounding boxes $\mathcal{R} = \{r_k\}_{k=1}^K$ on t using teacher $\theta_t$.
8:             Select $\mathcal{R}' \subseteq \mathcal{R}$ as pseudo labels by Eq. (3).
9:             Train student $\theta_s$ using $t'_m$ and $\mathcal{R}'$ by Eq. (5).
10:         end while
11:         Update teacher $\theta_t$ using Eq. (6).
12:     end while It is worth noting that the mean teacher idea has been introduced to address domain adaptive detection, though for UDAD. CycleGAN was used to generate source-like target images and target-like source images as input to the student 120 and the teacher 110, respectively, to mitigate model bias. Training CycleGAN requires access to data from both domains. So, it is not feasible to the SFDAD problem. Another conventional art proposes to enforce the consistency of the relation graphs of region proposals constructed with the student and the teacher. The key difference of the exemplary method to the existing two is that the teacher detector generates pseudo labels from a normal image but the student detector is trained with a strongly augmented view of the same image. The normal image makes it easier to get reliable pseudo labels as it is not perturbed. Training the student model with the strongly augmented view encourages it to be robust with changes in the image space. This is similar to what is done in the pretraining phase. There is no such differentiation in the existing methods.

FIG. 1 is a block/flow diagram of an exemplary self-trained mean teacher model framework (or Strong data Augmentation and a Self-Trained Mean Teacher model (SA-STMT) 100), in accordance with embodiments of the present invention.

Given an unlabeled target image 102, multiple strongly augmented views 104 are generated. Then, region proposals 106 are produced by the teacher 110 from the image 102. The region proposals 106 are mapped to the strongly augmented views 104 to help select pseudo ground truth boxes by the consistency constraint that requires a region proposal to be classified as the same class across different views. A confidence constraint is also used to select pseudo ground truth boxes, which requires the highest classification score of a region proposal to be above a predetermined threshold. The obtained pseudo ground truth boxes are used to train the student detector 120 via gradient back-propagation. The teacher 110 is updated as the exponential moving average of the student 120.

A detection model trained with only labeled images from the source domain enjoys significant performance boost on the target domain when strong data augmentation is applied on the source images during the training process. The performance is comparable with many existing domain adaptive detection methods that are trained jointly with labeled source images and unlabeled target images. The reason is that the strong data augmentation includes a wide range of image transformations, and their combinations can model a wide range of factors that cause domain shifts. Applying them on images stochastically and training the detection model to be resistant with these factors, the generalizability of the model is accordingly enhanced.

Therefore, the exemplary embodiments propose the Self-Training based Mean-Teacher SA-STMT model 100, which exploits data augmentation to produce reliable pseudo labels using the teacher model 110 and uses the pseudo labels to supervise the student model 120. To produce reliable pseudo labels and mitigate the negative impacts of incorrect pseudo labels.

The exemplary embodiments constrain a region proposal to meet two conditions before it is taken as a pseudo ground, that is, its classification confidence should be sufficiently high (above a predetermined threshold), and it should be classified consistently when mapped to different strongly augmented images.

To train the student model 120, besides using the object detection loss 130, which could be unreliable due to the possible existence of incorrect pseudo labels, the exemplary embodiments further add two loss terms. One is the KL divergence constraint for the classification probability scores produced by the teacher model 110 and the student model 120, respectively, for the same region proposal 106. The other one is the L2 norm of the bounding box regression offsets produced the teacher model 110 and the student model 120, respectively, for the same region proposal. These two loss terms provide reliable supervision signal to train the student model 120, and, thus, can dilute the possible harmful effect of the possibly unreliable detection loss.

The exemplary embodiments adopt the mean teacher framework where the teacher only slightly updates itself from the student each time. The gradually updated teacher model is more resilient to the sudden weight turbulence of the student model due to a wrong label prediction of the teacher model, even if the student model is fed with a wrong label, its influence on the teacher model is mitigated by the exponential moving average. Besides resiliency to occasional wrong pseudo-labels, EMA is also known to lead to better generalization.

Figure 2:
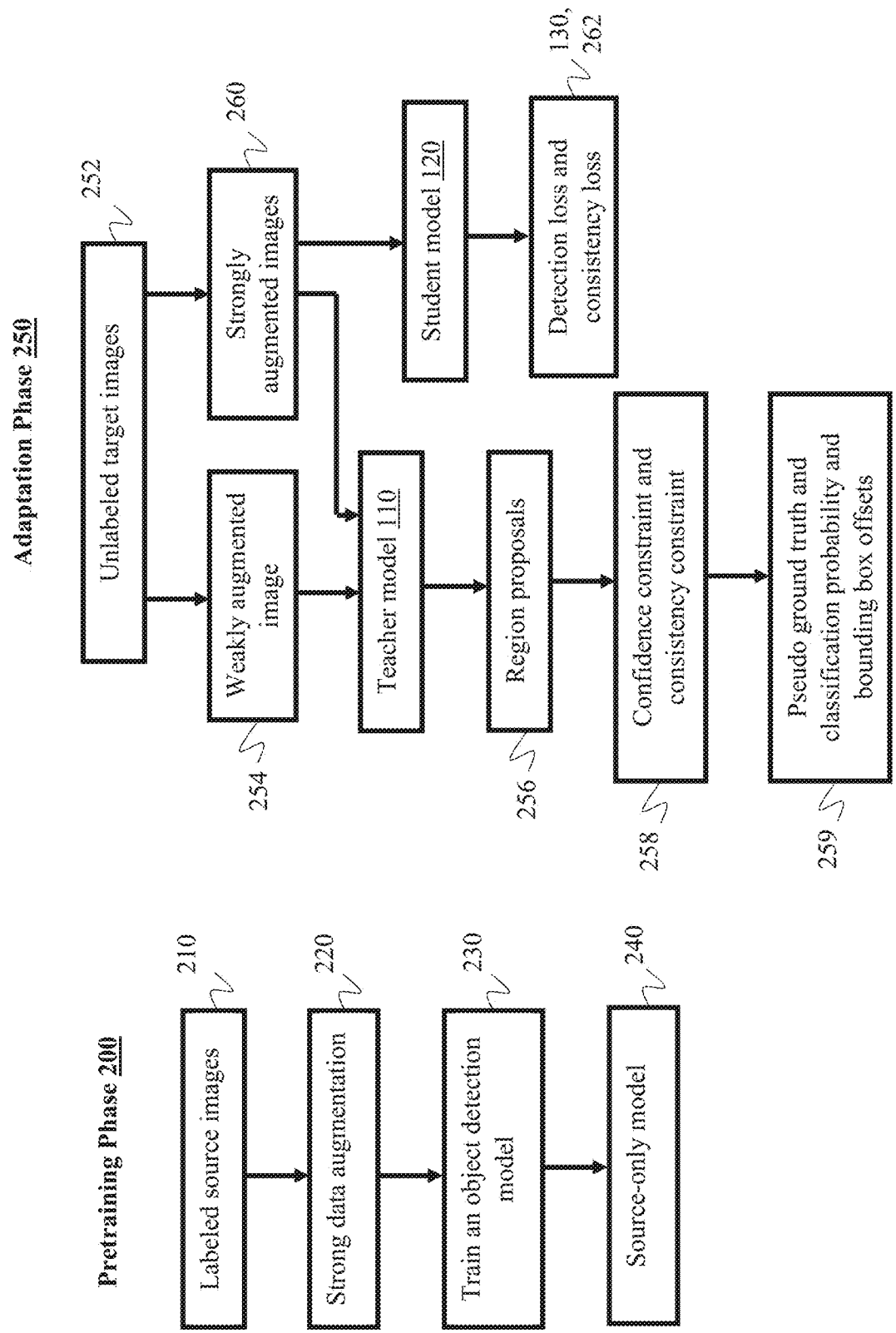
FIG. 2 is block/flow diagram of an exemplary pretraining phase and adaptation phase of the self-trained mean teacher model framework, in accordance with embodiments of the present invention.

FIG. 2 is block/flow diagram of an exemplary pretraining phase and adaptation phase of the self-trained mean teacher model framework, in accordance with embodiments of the present invention.

In a pretraining phase 200, labeled source images 210 are exposed to strong data augmentation 220 and an object detection model is trained 230 to generate a source-only model 240.

In an adaptation phase 250, a weakly augmented image 254 and strongly augmented images 260 are extracted from unlabeled target images 252. The images 254, 260 are fed to the teacher model 110, where region proposals 256 are generated, confidence and consistency constraints 258 are applied, and pseudo ground truth and classification probability and bounding box offsets 259 are generated. The student model 120 is trained with a detection loss 130 and a consistency loss 262.

The exemplary embodiments address the source-free cross-domain detection problem in two phases, the pretraining phase and the adaptation phase.

In the pretraining phase, given a labeled source dataset, the exemplary embodiments apply strong data augmentation that produces highly perturbed images and use them to train a detection model. The output model is used for the next adaptation phase.

In the adaptation phase, the exemplary embodiments train a self-trained mean teacher model by taking the pretrained model and unlabeled target samples as input and executing the following steps.

Initialize the student and teacher model with the pretrained model.

For each unlabeled target image, apply both weak and strong augmentations and generate one weakly augmented image and multiple strongly augmented images.

Generate region proposals from the weakly augmented image by the teacher model.

Select a region proposal as pseudo ground truth if it meets the two conditions noted above.

Return the selected pseudo ground truth proposals and the corresponding classification scores and bounding box regression offsets when mapped to one of the strongly augmented images.

Train the student model by taking one of the strongly augmented images as input. The model is trained jointly with the object detection loss, the KL divergence loss of classification scores of the pseudo ground truth proposals by the teacher model and the student model, and the L2 norm of the bounding box regression offsets of the pseudo ground truth proposals by the teacher model and the student model.

Update the teacher model as the moving average of the student model.

Figure 3:
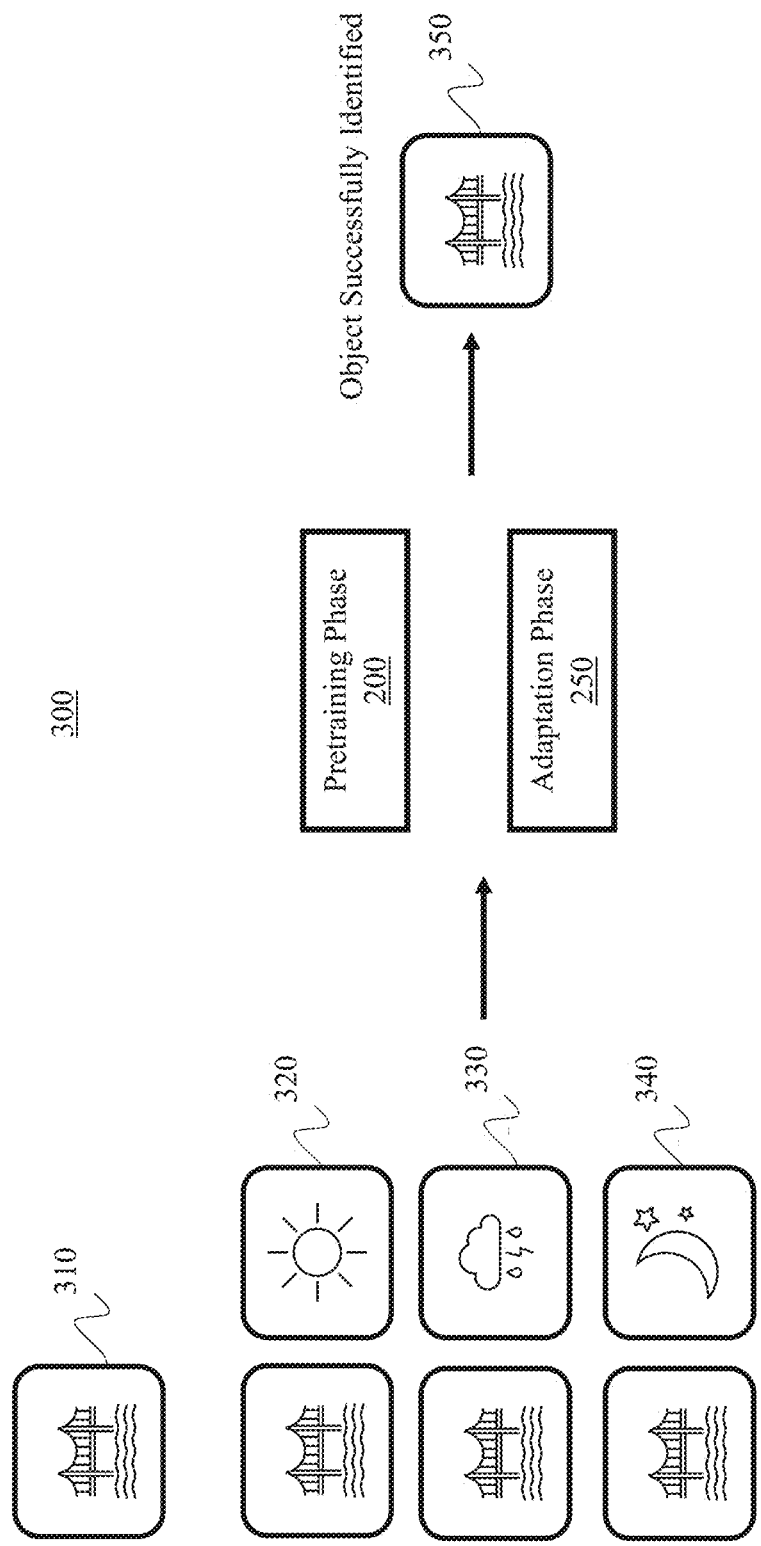
FIG. 3 is a block/flow diagram of a practical application for applying the self-trained mean teacher model framework, in accordance with embodiments of the present invention.

FIG. 3 is a block/flow diagram of a practical application 300 for applying the self-trained mean teacher model framework, in accordance with embodiments of the present invention.

An image 310 needs to be identified by an object detector. The image 310 can be captured on a sunny day 320, a rainy day 330 or during nighttime 340. The self-trained mean teacher model 110 employs the pretraining phase 200 and the adaptation phase 250 to successfully obtain the original image 310 regardless of conditions.

Therefore, according to FIGS. 1-3, the Source-Free Cross Domain Detection (SFXDD) issue is addressed in two phases.

In the first phase, a data augmentation technique is employed which produces highly perturbed images when training the detection model on labeled source images. It is found that this simple technique significantly improves the performance of the learned detection model in the target domain, that is, this source-only model outperforms many existing UDAD methods that use various sophisticated techniques to align the domains using both images from both domains.

In the second phase, the learned source-only model is adapted to the target domain using the unlabeled images by proposing a self-trained mean teacher model. For each unlabeled target image, different types of data augmentations are applied, one lightly perturbed view is generated and multiple strongly views are generated for the image. The teacher model detects objects from the lightly perturbed view. The exemplary embodiments select confidence objects as pseudo ground truth objects by thresholding the classification probability and measuring the repeatability when mapped to the corresponding strongly views. With the pseudo ground truth objects, the exemplary methods can now train the student model in a supervised fashion.

Figure 4:
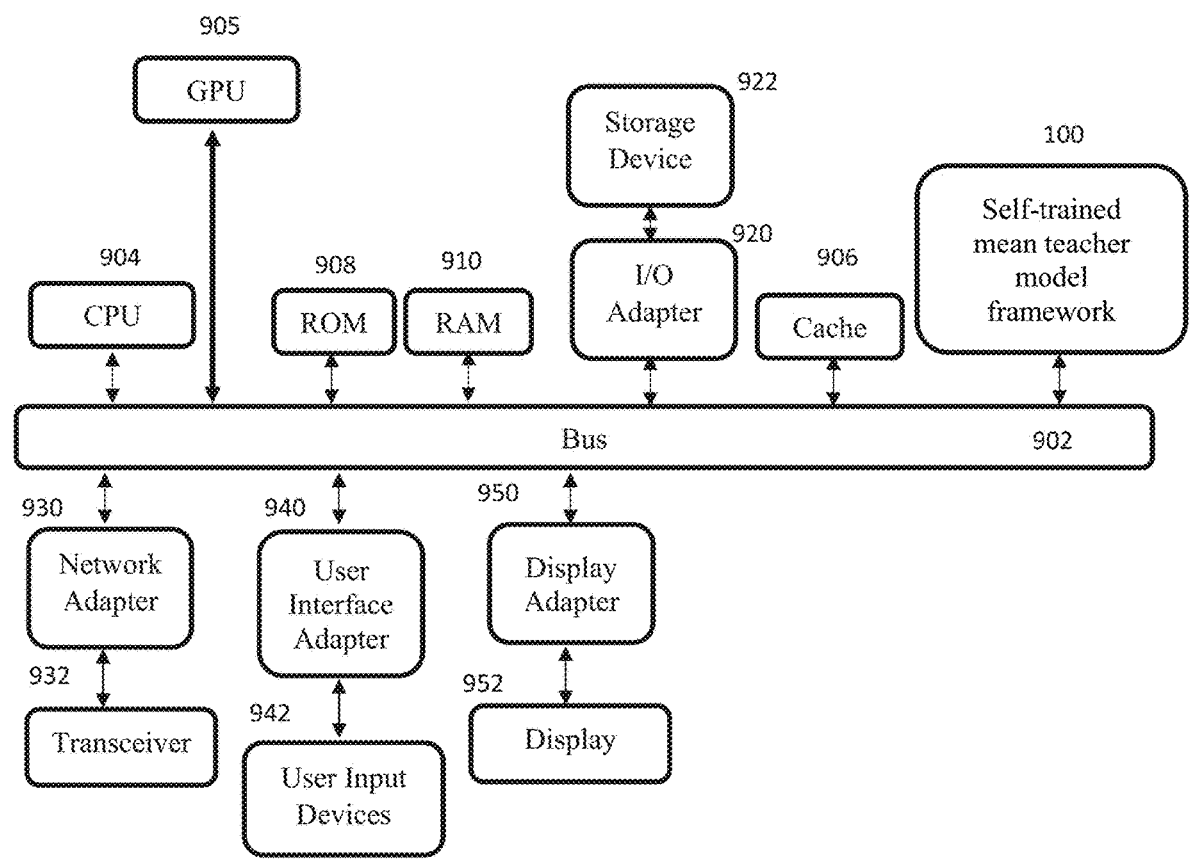
FIG. 4 is an exemplary processing system for applying the self-trained mean teacher model framework, in accordance with embodiments of the present invention.

FIG. 4 is an exemplary processing system for applying the self-trained mean teacher model framework, in accordance with embodiments of the present invention.

The processing system includes at least one processor (CPU) 904 operatively coupled to other components via a system bus 902. A Graphical Processing Unit (GPU) 905, a cache 906, a Read Only Memory (ROM) 908, a Random Access Memory (RAM) 910, an Input/Output (I/O) adapter 920, a network adapter 930, a user interface adapter 940, and a display adapter 950, are operatively coupled to the system bus 902. Additionally, a self-trained teacher model framework 100 is employed to perform source-free domain adaptive detection with strong augmentation and a self-trained mean teacher (or with Strong data Augmentation and a Self-Trained Mean Teacher model (SA-STMT) 100).

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 5:
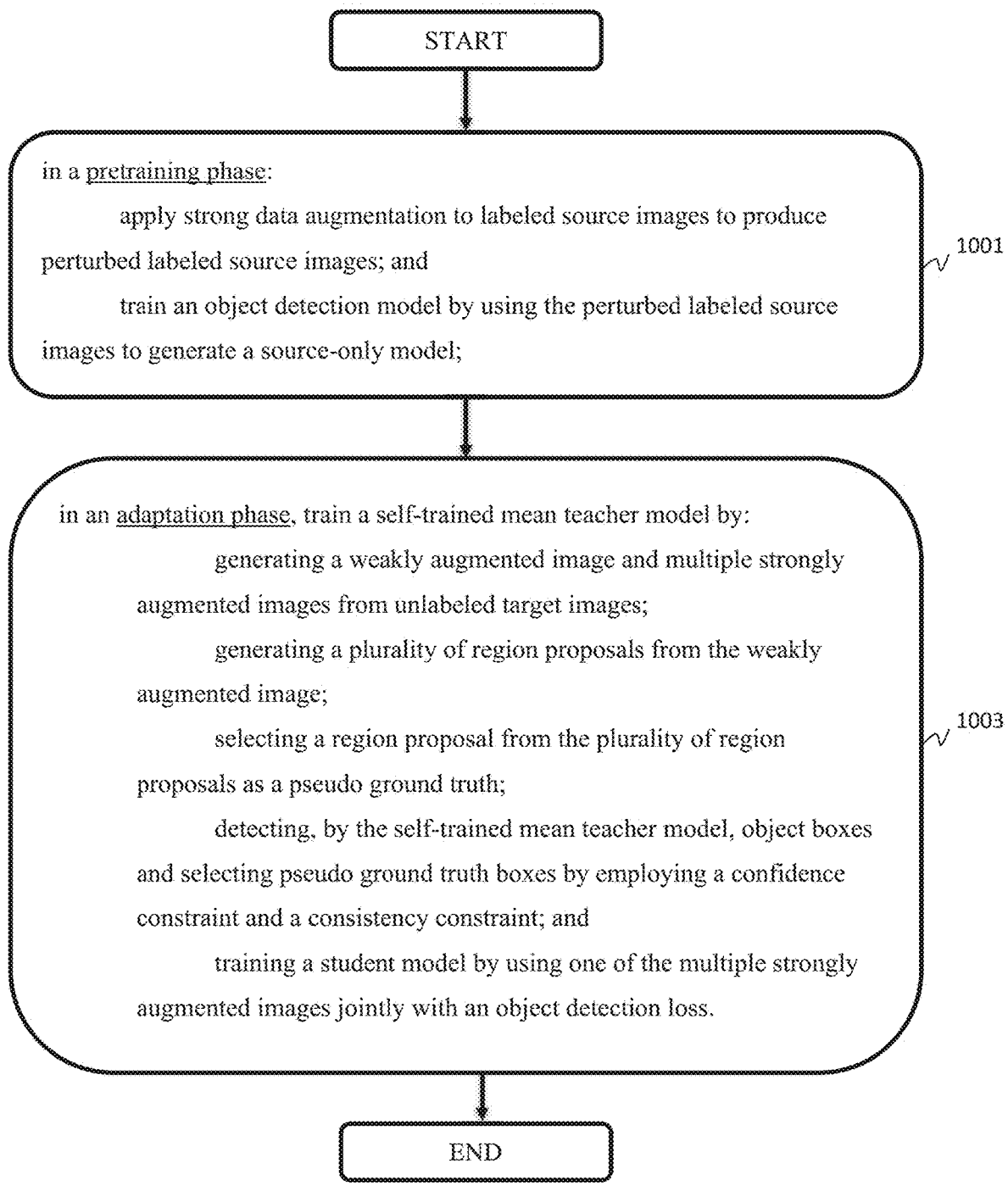
FIG. 5 is a block/flow diagram of an exemplary method for applying the self-trained mean teacher model framework, in accordance with embodiments of the present invention.

FIG. 5 is a block/flow diagram of an exemplary method for applying the self-trained mean teacher model framework (or Strong data Augmentation and a Self-Trained Mean Teacher model (SA-STMT)), in accordance with embodiments of the present invention.

At block 1001, in a pretraining phase, apply strong data augmentation to labeled source images to produce perturbed labeled source images and train an object detection model by using the perturbed labeled source images to generate a source-only model.

At block 1003, in an adaptation phase, train a self-trained mean teacher model by generating a weakly augmented image and multiple strongly augmented images from unlabeled target images, generating a plurality of region proposals from the weakly augmented image, selecting a region proposal from the plurality of region proposals as a pseudo ground truth, detecting, by the self-trained mean teacher model, object boxes and selecting pseudo ground truth boxes by employing a confidence constraint and a consistency constraint, and training a student model by using one of the multiple strongly augmented images jointly with an object detection loss.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from another computing device or can be received indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, RAM, ROM, an Erasable Programmable Read-Only Memory (EPROM or Flash memory), an optical fiber, a portable CD-ROM, an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for implementing source-free domain adaptive detection, the method comprising:
   in a pretraining phase:
      applying a first level of data augmentation to labeled source images to produce perturbed labeled source images; and
      training an object detection model by using the perturbed labeled source images to generate a source-only model; and
   in an adaptation phase, train a self-trained mean teacher model by:
      generating an augmented image with a second level of data augmentation that is less perturbed than the first level of data augmentation and multiple first level of data augmentation augmented images from unlabeled target images;
      generating a plurality of region proposals from the second level augmented image;
      selecting a region proposal from the plurality of region proposals as a pseudo ground truth;
      detecting, by the self-trained mean teacher model, object boxes and selecting pseudo ground truth boxes by employing a confidence constraint and a consistency constraint; and
      training a student model by using one of the multiple first level of data augmentation augmented images jointly with an object detection loss.

2. The method of claim 1, wherein the confidence constraint requires a highest classification score of a detected object of interest in a scene to be greater than a predetermined threshold.

3. The method of claim 1, wherein the consistency constraint requires a detected object of interest in a scene to be classified as a same class when mapped to all of the multiple first level of data augmentation augmented images.

4. The method of claim 1, wherein the self-trained mean teacher model is updated as a moving average of the student model and the student model is updated with gradient back-propagation.

5. The method of claim 1, wherein the first level of data augmentation is a stochastic function and the multiple first level of data augmentation augmented images are all different with respect to each other.

6. The method of claim 1, wherein the student model is trained by further using a KL divergence loss of classification scores of the selected pseudo ground truth and an L2 norm of bounding box regression offsets of the selected pseudo ground truth.

7. The method of claim 1, wherein the plurality of region proposals are mapped to the multiple first level of data augmentation augmented images to help select the pseudo ground truth boxes.

8. A non-transitory computer-readable storage medium comprising a computer-readable program for implementing source-free domain adaptive detection, wherein the computer-readable program when executed on a computer causes the computer to perform the steps of:
   in a pretraining phase:
      applying a first level of data augmentation to labeled source images to produce perturbed labeled source images; and
      training an object detection model by using the perturbed labeled source images to generate a source-only model; and
   in an adaptation phase, train a self-trained mean teacher model by:
      generating an augmented image with a second level of data augmentation that is less perturbed than the first level of data augmentation and multiple first level of data augmentation augmented images from unlabeled target images;
      generating a plurality of region proposals from the second level augmented image;
      selecting a region proposal from the plurality of region proposals as a pseudo ground truth;
      detecting, by the self-trained mean teacher model, object boxes and selecting pseudo ground truth boxes by employing a confidence constraint and a consistency constraint; and
      training a student model by using one of the multiple first level of data augmentation augmented images jointly with an object detection loss.

9. The non-transitory computer-readable storage medium of claim 8, wherein the confidence constraint requires a highest classification score of a detected object of interest in a scene to be greater than a predetermined threshold.

10. The non-transitory computer-readable storage medium of claim 8, wherein the consistency constraint requires a detected object of interest in a scene to be classified as a same class when mapped to all of the multiple first level of data augmentation augmented images.

11. The non-transitory computer-readable storage medium of claim 8, wherein the self-trained mean teacher model is updated as a moving average of the student model and the student model is updated with gradient back-propagation.

12. The non-transitory computer-readable storage medium of claim 8, wherein the first level of data augmentation is a stochastic function and the multiple first level of data augmentation augmented images are all different with respect to each other.

13. The non-transitory computer-readable storage medium of claim 8, wherein the student model is trained by further using a KL divergence loss of classification scores of the selected pseudo ground truth and an L2 norm of bounding box regression offsets of the selected pseudo ground truth.

14. The non-transitory computer-readable storage medium of claim 8, wherein the plurality of region proposals are mapped to the multiple first level of data augmentation augmented images to help select the pseudo ground truth boxes.

15. A system for implementing source-free domain adaptive detection, the system comprising:
   a memory; and
   one or more processors in communication with the memory configured to:
      in a pretraining phase:
         apply a first level of data augmentation to labeled source images to produce perturbed labeled source images; and train an object detection model by using the perturbed labeled source images to generate a source-only model; and in an adaptation phase, train a self-trained mean teacher model by:

generating an augmented image with a second level of data augmentation that is less perturbed than the first level of data augmentation and multiple first level of data augmentation augmented images from unlabeled target images;

generating a plurality of region proposals from the second level augmented image;

selecting a region proposal from the plurality of region proposals as a pseudo ground truth;

detecting, by the self-trained mean teacher model, object boxes and selecting pseudo ground truth boxes by employing a confidence constraint and a consistency constraint; and training a student model by using one of the multiple first level of data augmentation augmented images jointly with an object detection loss.

16. The system of claim 15, wherein the confidence constraint requires a highest classification score of a detected object of interest in a scene to be greater than a predetermined threshold.

17. The system of claim 15, wherein the consistency constraint requires a detected object of interest in a scene to be classified as a same class when mapped to all of the multiple first level of data augmentation augmented images.

18. The system of claim 15, wherein the self-trained mean teacher model is updated as a moving average of the student model and the student model is updated with gradient back-propagation.

19. The system of claim 15, wherein the first level of data augmentation is a stochastic function and the multiple first level of data augmentation augmented images are all different with respect to each other.

20. The system of claim 15, wherein the student model is trained by further using a KL divergence loss of classification scores of the selected pseudo ground truth and an L2 norm of bounding box regression offsets of the selected pseudo ground truth.

* * * * *